US008927110B2

(12) United States Patent
Idei et al.

(10) Patent No.: US 8,927,110 B2
(45) Date of Patent: Jan. 6, 2015

(54) PRINTING PAPER AND METHOD FOR FORMING PRINTED IMAGES

(75) Inventors: Koji Idei, Tokyo (JP); Masanori Nagoshi, Tokyo (JP); Kazutoshi Iida, Tokyo (JP); Atsushi Nakamura, Tokyo (JP)

(73) Assignee: Mitsubishi Paper Mills Limited, Tokyo (JP)

( * ) Notice: Subject to any disclaimer, the term of this patent is extended or adjusted under 35 U.S.C. 154(b) by 0 days.

(21) Appl. No.: 13/876,783

(22) PCT Filed: Sep. 21, 2011

(86) PCT No.: PCT/JP2011/071447

§ 371 (c)(1), (2), (4) Date: Mar. 28, 2013

(87) PCT Pub. No.: WO2012/043322

PCT Pub. Date: Apr. 5, 2012

(65) Prior Publication Data

US 2013/0187977 A1 Jul. 25, 2013

(30) Foreign Application Priority Data

Sep. 29, 2010 (JP) ................................ 2010-218820
Sep. 30, 2010 (JP) ................................ 2010-221308
Sep. 30, 2010 (JP) ................................ 2010-221309
Sep. 30, 2010 (JP) ................................ 2010-221310
Sep. 30, 2010 (JP) ................................ 2010-221311

(51) Int. Cl.
*B32B 23/04* (2006.01)

(52) U.S. Cl.
USPC .................... 428/532; 428/537.5; 428/32.21; 427/384

(58) Field of Classification Search
USPC .................... 428/532, 537.5, 32.21; 427/384
See application file for complete search history.

(56) References Cited

U.S. PATENT DOCUMENTS 7,569,255 B2 * 8/2009 Dannhauser et al. ...... 427/407.1
8,034,422 B2 * 10/2011 Dannhauser et al. ...... 428/32.18
8,602,550 B2 * 12/2013 Idei et al. ...................... 347/105
8,609,210 B2 * 12/2013 Nagoshi et al. ............ 428/32.21

FOREIGN PATENT DOCUMENTS

JP 10-166713 A 6/1998
JP 2002-172851 * 6/2002
JP 2002-172851 A 6/2002
JP 2003-251928 A 9/2003
JP 2004-114627 * 4/2004
JP 2004-114627 A 4/2004
JP 2005-133234 A 5/2005
JP 2005-288758 A 10/2005
JP 2005-320651 A 11/2005
JP 2006-256001 A 9/2006
JP 2009-23292 A 2/2009
JP 2009-132147 A 6/2009

* cited by examiner

*Primary Examiner* — Leszek Kiliman
(74) *Attorney, Agent, or Firm* — Birch, Stewart, Kolasch & Birch, LLP

(57) ABSTRACT

The present invention provides plain printing paper comprising a paper substrate containing, as main components, cellulose pulp and calcium carbonate as a filler, and an optional cationic resin and a multivalent cation salt attached onto the paper substrate, wherein the total amount of the cationic resin and the multivalent cation salt attached on both surfaces of the paper substrate is 1.0 g/m$^2$ to 5.0 g/m$^2$, both inclusive, and the mass ratio of the cationic resin to the multivalent cation salt is 0:100 to 90:10, both inclusive.

4 Claims, No Drawings

PRINTING PAPER AND METHOD FOR FORMING PRINTED IMAGES

TECHNICAL FIELD

The present invention relates to printing paper and a method for forming printed images. In more detail, the invention relates to plain printing paper and a method for forming printed images.

BACKGROUND ART

Ink jet recording which creates images using water-soluble inks has made marked strides recently. Ink jet recording is a type of printing that creates images and characters by ejecting small droplets of ink based on various principles to allow them to land on recording sheets such as paper. Ink jet recording is fast and quiet, facilitates multicolor printing, is versatile in terms of recordable patterns, and is free from the need of development or fixation. Thus, its use has become rapidly widespread in various applications to enable printing machines to print various figures including Chinese characters as well as color images. Further, ink jet recording can produce images which stand comparison with prints made by offset printing according to a printing plate technique or by a color photographic technique. Furthermore, ink jet recording has been widely used in the full color field because a small number of copies can be printed more inexpensively than by offset printing or a photographic technique.

As a result of further progress in the technology, ink jet recording has recently become used in industrial printing (hereinafter, referred to as "ink jet printing"). Because large numbers of copies are printed in the industrial printing field, printing speed is important due to the tradeoff between productivity and printing costs. A printing speed suitable for ink jet printing is achieved with a printing machine that is equipped with a line head in which ink-ejecting heads are fixed in the entirety of the width direction perpendicular to the paper transport direction (hereinafter, such a printing machine will be referred to as "ink jet printing machine") (see, for example, Patent Literature 1). More recently, rotary ink jet printing machines having a printing speed of 15 m/min or more, a higher speed of 60 m/min or more, and a still higher speed in excess of 120 m/min have been developed. Rotary ink jet printing machines are also utilized in on-demand printing applications such as printing of addresses, printing of customer information, printing of numbers, and printing of bar codes. Because ink jet printing machines allow for handling of variable information, their use is particularly found in on-demand printing. In such applications, a preferred manner of industrial printing is to preliminarily print fixed information by offset printing and to print variable information by ink jet printing.

The types of printing paper used for ink jet printing machines are broadly categorized into so-called plain printing paper such as high-quality paper and PPC paper, and coated printing paper having a distinct ink receiving layer on a paper substrate.

Low-cost plain printing paper represents the overwhelming majority of paper used for industrial ink jet printing machines. Frequent applications of plain printing paper include invoices and account statements, and ad-papers and direct mails, as well as a combination thereof, namely, so-called transaction mail promotion. Because of the absence of an ink-receiving layer, however, such plain printing paper is poor in ink absorption properties compared to coated printing paper, resulting in the occurrence of uneven printing.

Inks used in ink jet printing machines are more frequently aqueous pigment inks replacing aqueous dye inks. The use of aqueous pigment inks encounters different problems from those in the case of aqueous dye inks.

The water resistance of images has been an important quality requirement in the use of aqueous dye inks. That is, the dye inks are required not to spread under highly humid conditions or in the event where the image is brought into contact with water for any reason.

On the other hand, the abrasion resistance of images is one of the quality requirements in the use of aqueous pigment inks. If the abrasion resistance of images is low, any friction on images after printing and drying causes the pigment inks to become detached and smear the printed images.

Uneven printing in printed sections is a problem encountered with pigment inks. Uneven printing is a phenomenon in which printing paper exhibits a nonuniform density of an ink fixed in the final printed image after the ink is dried to cause uneven ink absorption properties during high speed printing. Because inks used in ink jet printing have a low concentration of color material, uneven printing tends to be more marked than in offset printing. The presence of uneven printing deteriorates the commercial value of prints.

Some types of plain-like ink jet recording paper are coated slightly with silica to achieve a higher printing density (see, for example, Patent Literatures 2 and 3). However, such recording paper is poor in offset printability and does not reflect any consideration of abrasion resistance. An improvement in printing density can be expected with plain ink jet recording paper that is coated with PVA to control the Stöckigt sizing degree (see, for example, Patent Literature 4). However, such recording paper is poor in abrasion resistance. Further, plain ink jet recording paper coated with colloidal silica and PVA achieves improved abrasion resistance (see, for example, Patent Literature 5), but is unsatisfactory in terms of offset printability.

CITATION LIST

Patent Literature

Patent Literature 1: Japanese Patent Application Kokai Publication No. 2009-23292

Patent Literature 2: Japanese Patent Application Kokai Publication No. 2009-132147

Patent Literature 3: Japanese Patent Application Kokai Publication No. 2006-256001

Patent Literature 4: Japanese Patent Application Kokai Publication No. 2005-288758

Patent Literature 5: Japanese Patent Application Kokai Publication No. 2003-251928

SUMMARY OF INVENTION

Technical Problem

As mentioned above, existing plain printing paper does not satisfy both of the suitability for offset printing and the suitability for ink jet printing with aqueous dye inks and aqueous pigment inks.

A first object of the invention is that plain printing paper satisfies the following requirements.

1. To have good offset printability.

2. To exhibit good ink absorption properties in ink jet printing with respect to both of aqueous dye inks and aqueous pigment inks.

3. To allow for high water resistance of images formed by ink jet printing with aqueous dye inks.

4. To allow for high abrasion resistance of images formed by ink jet printing with aqueous pigment inks, and to sufficiently suppress the occurrence of uneven printing during such printing.

A second object of the invention is to provide a method which can form printed images without the occurrence of uneven printing even when pigment inks are used for ink jet printing at a printing speed of 60 m/min or more.

A third object of the invention is to provide a method for forming excellent printed images using an offset printing machine and/or an ink jet printing machine.

Solution to Problem

That is, the invention provides printing paper comprising a paper substrate containing, as main components, cellulose pulp and calcium carbonate as a filler, and an optional cationic resin, and a multivalent cation salt attached onto the paper substrate, wherein the total amount of the cationic resin and the multivalent cation salt attached on both surfaces of the paper substrate is 1.0 g/m$^2$ to 5.0 g/m$^2$, both inclusive, and the mass ratio of the cationic resin to the multivalent cation salt is 0:100 to 90:10, both inclusive. Such printing paper satisfies the first object, namely, has good offset printability, exhibits good ink absorption properties in ink jet printing with respect to both of aqueous dye inks and aqueous pigment inks, allows for high water resistance of images formed by ink jet printing with aqueous dye inks, and allows for high abrasion resistance of images formed by ink jet printing with aqueous pigment inks and sufficiently suppresses the occurrence of uneven printing during such printing. Thus, the printing paper of the present invention may be suitably used in industrial printing where fixed information is printed with an offset printing machine and variable information is printed with an ink jet printing machine.

Further, the invention provides a printing method using an ink jet printing machine which comprises ink jet printing using a pigment ink on the above printing paper at a printing speed of 60 m/min or more to form a printed image. According to this method, printed images can be formed without the occurrence of uneven printing even when ink jet printing is performed at a printing speed of 60 m/min or more.

Furthermore, the invention provides a method which comprises forming a printed image on the above printing paper using an offset printing machine and/or an ink jet printing machine. According to this method, excellent printed images can be formed using an offset printing machine and/or an ink jet printing machine.

EMBODIMENTS FOR CARRYING OUT THE INVENTION

As used herein, the term "ink jet printing machine" refers to an industrial printing machine that is used in industrial printing utilizing the ink jet recording technique. For example, such a printing machine is an ink jet printing machine having a printing speed of 15 m/min or more, a higher speed of 60 m/min or more, and a still higher speed in excess of 120 m/min, or a rotary ink jet printing machine using pigment inks. As used herein, the term "ink jet printing machine" is distinguished from ink jet recording printers having a printing speed of several meters per minute such as small home printers and large format printers (hereinafter, such printers will be referred to as "ink jet printers"). As used herein, the term "ink jet printing" refers to industrial printing based on the ink jet recording technique using an ink jet printing machine.

Offset printing is an indirect printing technique in which an ink is transferred first to a blanket and then to a workpiece. To have good offset printability means that no problems such as blanket piling are found after offset printing.

Uneven printing is a phenomenon in which printing paper exhibits a nonuniform density of an ink fixed in the final printed image after the ink is dried to cause uneven ink absorption properties during high speed printing.

Hereinbelow, the printing paper of the invention will be described in detail.

The printing paper of the invention includes, as main components, a paper substrate containing cellulose pulp and calcium carbonate as a filler. The paper substrate used in the printing paper of the present invention is a sheet containing cellulose pulp and a filler as main components. Examples of the cellulose pulp include chemical pulps such as LBKP (Leaf Bleached Kraft Pulp) and NBKP (Needle Bleached Kraft Pulp), mechanical pulps such as GP (Groundwood Pulp), PGW (Pressure GroundWood pulp), RMP (Refiner Mechanical Pulp), TMP (ThermoMechanical Pulp), CTMP (ChemiThermoMechanical Pulp), CMP (ChemiMechanical Pulp) and CGP (ChemiGroundwood Pulp), and waste paper pulps such as DIP (DeInked Pulp). These pulps may be used singly or in any combination.

The calcium carbonate used as the filler in the present invention may be precipitated calcium carbonate, ground calcium carbonate or both in combination. Other fillers such as talc and kaolin may be additionally used while still achieving the desired effects of the invention. In the present invention, the paper substrate may contain the calcium carbonate in an amount of 50 parts by mass or more relative to the total of filler(s) in the substrate.

In addition to the cellulose pulp and the filler, the paper substrate of the present invention may contain various additives such as sizing agents, fixing agents, retention aids, cationizing agents and paper strengthening additives. The paper substrate of the present invention may be produced by mixing the cellulose pulp and the filler as well as various additives such as sizing agents, fixing agents, retention aids, cationizing agents and paper strengthening additives, and making the resultant paper stock into paper with any of various papermaking machines such as Fourdrinier machines, cylinder paper machines and twin wire machines.

In the present invention, the paper substrate may appropriately further contain other additives such as dispersants, thickening agents, fluidity improving agents, defoamers, antifoamers, releasing agents, foaming agents, penetrating agents, coloring dyes, coloring pigments, optical brighteners, ultraviolet absorbers, antioxidants, preservatives, fungicides, insolubilizers, wet paper strengthening additives and dry paper strengthening additives while still achieving the desired effects of the invention.

In the present invention, the sizing degree of the paper substrate may be any sizing degree as long as the desired effects of the invention are achieved. The sizing degree may be controlled by controlling the amount of an internal sizing agent or the amount of a surface sizing agent applied onto the paper substrate. Examples of the internal sizing agents include rosin sizing agents for acid paper, and alkenyl succinic acid anhydrides, alkyl ketene dimers, neutral rosin sizing agents and cationic styrene-acrylic sizing agents for alkaline paper. Examples of the surface sizing agents include styrene-acrylic sizing agents, olefin sizing agents and styrene-maleic sizing agents. In particular, a cationic or nonionic surface sizing agent is preferable when the sizing agent is applied together with a cationic resin and a multivalent cation salt described later.

From the viewpoints of absorptivity of ink jet inks and the prevention of uneven printing, the ash content in the paper substrate is preferably 8 mass % to 25 mass %, both inclusive. When the ash content is 8 mass % or more, the occurrence of uneven printing can be suppressed. An ash content of 25 mass % or less ensures that the occurrence of troubles such as picking and paper break during offset printing ascribed to insufficient strength of base paper can be prevented. The ash content is more preferably 10 mass % to 20 mass %, both inclusive.

In the present invention, the ash content is a ratio (mass %) of the mass of incombustibles remaining after the paper substrate undergoes a combustion treatment at 500° C. for 1 hour to the absolute dry mass of the paper substrate before the combustion treatment. The ash content may be controlled by controlling the content of components such as the filler in the paper substrate.

In the present invention, the thickness of the paper substrate is not particularly limited. The thickness of the paper substrate is preferably 50 μm to 300 μm, both inclusive, and more preferably 60 μm to 250 μm, both inclusive.

In the printing paper of the present invention, an optional cationic resin, and a multivalent cation salt are attached onto the paper substrate. The total amount of the cationic resin and the multivalent cation salt attached on both surfaces of the paper substrate is 1.0 $g/m^2$ to 5.0 $g/m^2$, both inclusive. The mass ratio of the cationic resin to the multivalent cation salt is 0:100 to 90:10, both inclusive.

The printing paper of the invention optionally includes a cationic resin as required. The cationic resin reacts with an anionic moiety of a dye ink to fix the dye ink and to provide water resistance of images created with the aqueous dye ink. As a result, it is possible to improve the water resistance of images that are created with aqueous dye inks used in ink jet printing which contain direct dyes or acid dyes.

The cationic resin which may be used in the invention is any of general cationic polymers or cationic oligomers without limitation. Preferred cationic resins are polymers or oligomers that contain a primary to tertiary amine or a quaternary ammonium salt which allows a proton to be easily coordinated thereto and which is ionized in water to provide the cationic property. Specific examples of the cationic resin include, although not limited to, compounds such as polyethyleneimine, polyvinylpyridine, polyaminesulfone, polydialkylaminoethyl methacrylate, polydialkylaminoethyl acrylate, polydialkylaminoethyl methacrylamide, polydialkylaminoethyl acrylamide, polyepoxyamine, polyamidoamine, dicyandiamide-formalin condensate, polyvinylamine and polyallylamine as well as hydrochlorides of these compounds, polydiallyldimethylammonium chloride, copolymers of diallyldimethylammonium chloride and a monomer such as acrylamide, polydiallylmethylamine hydrochloride, and dimethylamine-epichlorohydrin polycondensate. A more preferred cationic resin is dimethylamine-epichlorohydrin polycondensate. In the present invention, the average molecular weight of the cationic resin is not particularly limited, but is preferably 500 to 20,000, both inclusive, more preferably 1,000 to 10,000, both inclusive. In a preferred embodiment of the present invention, the cationic resin is dimethylamine-epichlorohydrin polycondensate. According to such a preferred embodiment, in particular, the printing paper achieves well-balanced ink jet printability.

The printing paper of the invention includes a multivalent cation salt. The multivalent cation salt fixes an ink by its multivalent cation. Thus, similarly to the cationic resin, this component is effective for fixing aqueous dye inks and for providing water resistance of images created with the aqueous dye inks. Further, this component exhibits a high effect also in the fixation of aqueous pigment inks.

The multivalent cation salt used in the present invention is a water-soluble salt containing a multivalent cation, and is preferably a salt of a multivalent cation which can be dissolved in 20° C. water at 1 mass % or more. Examples of the multivalent cations include divalent cations such as magnesium, calcium, strontium, barium, nickel, zinc, copper, iron, cobalt, tin and manganese, trivalent cations such as aluminum ion, iron and chromium, tetravalent cations such as titanium and zirconium, and complex ions of these ions. The anion forming the salt with the multivalent cation may be any of inorganic acids and organic acids without limitation. Examples of the inorganic acids include, although not limited to, hydrochloric acid, nitric acid, phosphoric acid, sulfuric acid, boric acid and hydrofluoric acid. Examples of the organic acids include, although not limited to, formic acid, acetic acid, lactic acid, citric acid, oxalic acid, succinic acid and organosulfonic acid. Preferred examples of the multivalent cation salts include calcium salts such as calcium chloride, calcium formate, calcium nitrate and calcium acetate. Calcium chloride is more preferable.

In a preferred embodiment of the present invention, the multivalent cation salt is a calcium salt. The reason why a calcium salt is preferable is probably as follows. In an aqueous solution, a calcium salt gives calcium ions, which easily form poorly water-soluble calcium salts such as calcium hydroxide and calcium carbonate. It may be said that uneven printing is ascribed to nonuniform ink fixation and nonuniform speeds of ink absorption. In addition to the fact that this multivalent cation salt, namely, a calcium salt, provides ink fixation as described above, the calcium salt microscopically forms a poorly water-soluble calcium salt on the surface of the calcium carbonate in an area of the paper substrate in which the area exhibits low ink absorption properties, and such a poorly water-soluble calcium salt probably allows a capillary phenomenon to occur. Thus, it is necessary that the paper substrate contain calcium carbonate. Such effects produced by a calcium salt are larger than by any of other multivalent cation salts.

In a preferred embodiment of the invention, the calcium salt is calcium chloride. Calcium chloride is highly effective for the suppression of the occurrence of uneven printing during ink jet printing probably because of its high moisture absorptivity.

In the present invention, the total amount of the optional cationic resin, and the multivalent cation salt attached on both surfaces of the paper substrate is in the range of 1.0 $g/m^2$ to 5.0 $g/m^2$, both inclusive, in terms of the amount of attached solids. Any smaller amount than the above range may lead to a failure to obtain sufficient water resistance or abrasion resistance of images. The effects in the improvements of ink absorption properties, water resistance of images, abrasion resistance of images and the suppression of uneven printing are saturated even if the amount is larger than the above range, thus causing cost disadvantages.

In the present invention, the mass ratio of the cationic resin to the multivalent cation salt is in the range of 0:100 to 90:10, both inclusive. In ink jet printing with an ink jet printing machine, the cationic resin tends to provide excellent water resistance of images created with aqueous dye inks. The multivalent cation salt tends to provide excellent abrasion resistance of images created with aqueous pigment inks and to suppress the occurrence of uneven printing when images are printed with aqueous pigment inks, and also tends to allow images formed with aqueous dye inks to exhibit high water resistance. Accordingly, the printing paper containing the cationic resin and the multivalent cation salt with the above mass ratio can achieve well-balanced suitability for both aqueous dye inks and aqueous pigment inks. In a preferred embodiment of the present invention, the mass ratio of the cationic resin to the multivalent cation salt is 10:90 to 80:20, both inclusive.

The printing paper of the invention may be produced by attaching the optional cationic resin, and the multivalent cation salt onto the paper substrate. The cationic resin and the multivalent cation salt may be attached onto the paper substrate by, for example, applying the cationic resin and the multivalent cation salt to the paper substrate or impregnating the paper substrate with the cationic resin and the multivalent cation salt. The application may be performed with any of various coaters such as size presses, film presses, gate roll coaters and film transfer coaters, as well as blade coaters, rod coaters, air knife coaters and curtain coaters. From the viewpoint of production costs, it is preferable that the components be applied on-machine with a coater such as a size press, a gate roll coater or a film transfer coater installed on the papermaking machine.

The printing paper in which the cationic resin and the multivalent cation salt are attached onto the paper substrate may be used as such. Alternatively, the surface of the printing paper may be smoothened as required using a device such as a on-line machine calender, a soft nip calender or a super calender.

However, excessive calendering for smoothing results in a decreased number of voids in the printing paper, thereby deteriorating ink absorption properties exhibited during ink jet printing. Thus, slight calendering is preferable. In detail, it is preferable that calendering be performed such that the density of the calendered paper becomes not more than 1.0 $g/cm^3$.

The inventive printing paper may be used not only for offset printing but also for other types of printing such as gravure printing and others. Further, the printing paper may be used for rotary or sheetfed industrial ink jet printing machines as well as for printers such as commercially available ink jet printers.

Another aspect of the invention is directed to a method for forming printed images which includes ink jet printing using a pigment ink on the above-described printing paper at a printing speed of 60 m/min or more. According to this method, the image quality of images printed with an ink jet printing machine can be improved. A further aspect of the invention is directed to a method for forming printed images on the above-described printing paper using an offset printing machine and/or an ink jet printing machine. According to this method, excellent printed images can be formed using an offset printing machine and/or an ink jet printing machine.

In all the aspects and embodiments described in the present invention, configurations, effects and contents which are similar to those described with respect to the first aspect and embodiment are not described anew each time where appropriate.

EXAMPLES

Hereinbelow, the present invention will be described by presenting Examples without limiting the scope of the invention to such Examples. In Examples, "part(s)" and "%" refer to part(s) by mass and mass %, respectively, unless otherwise mentioned.

(Production of Paper Substrate)

To a pulp slurry which contained 100 parts of LBKP having a freeness of 400 mlcsf were added 15 parts of precipitated calcium carbonate (product name: TP-121, manufactured by OKUTAMA KOGYO CO., LTD.) as a filler, 0.8 parts of amphoteric starch (product name: Cato 3210, manufactured by Nippon NSC Co., Ltd.), 0.8 parts of aluminum sulfate and 0.05 parts of an alkyl ketene dimer sizing agent (product name: Sizepine K903, manufactured by Arakawa Chemical Industries, Ltd.). The resultant paper stock was made into paper with a Fourdrinier machine, thereby producing a paper substrate having a basis weight of 80 $g/m^2$. The ash content in the paper substrate was 13.0%.

Example 1

With an on-machine film transfer coater, oxidized starch (product name: MS #3800, manufactured by NIHON SHOKUHIN KAKO CO., LTD.) and calcium chloride as a multivalent cation salt were attached onto the above-produced paper substrate in amounts of 2.5 $g/m^2$ and 2.0 $g/m^2$, respectively, in terms of the amounts of solids attached onto both surfaces of the paper substrate. The resultant paper was on-line machine calendered, thereby producing printing paper of Example 1.

Example 2

Printing paper of Example 2 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 1.8 $g/m^2$ and 0.2 $g/m^2$, respectively, in terms of the amounts of solids attached onto both surfaces of the paper substrate.

Example 3

Printing paper of Example 3 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 1.5 $g/m^2$ and 0.5 $g/m^2$, respectively, in terms of the amounts of solids attached onto both surfaces of the paper substrate.

Example 4

Printing paper of Example 4 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 1.0 $g/m^2$ and 1.0 $g/m^2$, respectively, in terms of the amounts of solids attached onto both surfaces of the paper substrate.

Example 5

Printing paper of Example 5 was produced in the same manner as in Example 1, except that calcium chloride used in Example 1 and dimethylamine-epichlorohydrin polycondensate sate (product name: JET FIX 5052, manufactured by Satoda Chemical Industrial Co., Ltd.) as a cationic resin were attached in amounts of 0.5 g/m$^2$ and 1.5 g/m$^2$, respectively, in terms of the amounts of solids attached onto both surfaces of the paper substrate.

Example 6

Printing paper of Example 6 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 0.2 g/m$^2$ and 1.8 g/m$^2$, respectively, in terms of the amounts of solids attached onto both surfaces of the paper substrate.

Example 7

Printing paper of Example 7 was produced in the same manner as in Example 1, except that calcium chloride used in Example 1 was attached in an amount of 4.0 g/m$^2$ in terms of the amount of solids attached onto both surfaces of the paper substrate.

Example 8

Printing paper of Example 8 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 3.6 g/m$^2$ and 0.4 g/m$^2$, respectively, in terms of the amounts of solids attached onto both surfaces of the paper substrate.

Example 9

Printing paper of Example 9 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 3.0 g/m$^2$ and 1.0 g/m$^2$, respectively, in terms of the amounts of solids attached onto both surfaces of the paper substrate.

Example 10

Printing paper of Example 10 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 2.0 g/m$^2$ and 2.0 g/m$^2$, respectively, in terms of the amounts of solids attached onto both surfaces of the paper substrate.

Example 11

Printing paper of Example 11 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 1.0 g/m$^2$ and 3.0 g/m$^2$, respectively, in terms of the amounts of solids attached onto both surfaces of the paper substrate.

Example 12

Printing paper of Example 12 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 0.4 g/m$^2$ and 3.6 g/m$^2$, respectively, in terms of the amounts of solids attached onto both surfaces of the paper substrate.

Example 13

Printing paper of Example 13 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 0.5 g/m$^2$ and 0.5 g/m$^2$, respectively, in terms of the amounts of solids attached onto both surfaces of the paper substrate.

Example 14

Printing paper of Example 14 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 1.5 g/m$^2$ and 1.5 g/m$^2$, respectively, in terms of the amounts of solids attached onto both surfaces of the paper substrate.

Example 15

Printing paper of Example 15 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 2.5 g/m$^2$ and 2.5 g/m$^2$, respectively, in terms of the amounts of solids attached onto both surfaces of the paper substrate.

Example 16

Printing paper of Example 16 was produced in the same manner as in Example 4, except that calcium chloride used in Example 4 was replaced by calcium formate.

Example 17

Printing paper of Example 17 was produced in the same manner as in Example 10, except that calcium chloride used in Example 10 was replaced by calcium formate.

Example 18

Printing paper of Example 18 was produced in the same manner as in Example 4, except that calcium chloride used in Example 4 was replaced by calcium nitrate.

Example 19

Printing paper of Example 19 was produced in the same manner as in Example 10, except that calcium chloride used in Example 10 was replaced by calcium nitrate.

Example 20

Printing paper of Example 20 was produced in the same manner as in Example 4, except that calcium chloride used in Example 4 was replaced by magnesium sulfate.

Example 21

Printing paper of Example 21 was produced in the same manner as in Example 10, except that calcium chloride used in Example 10 was replaced by magnesium sulfate.

Example 22

Printing paper of Example 22 was produced in the same manner as in Example 4, except that the dimethylamine-epichlorohydrin polycondensate (product name: JET FIX 5052, manufactured by Satoda Chemical Industrial Co., Ltd.) used in Example 4 was replaced by an acrylamide-diallylamine copolymer (product name: SUMIREZ resin 1001, manufactured by Sumitomo Chemical Co., Ltd.).

Example 23

Printing paper of Example 23 was produced in the same manner as in Example 10, except that the dimethylamine-epichlorohydrin polycondensate (product name: JET FIX 5052, manufactured by Satoda Chemical Industrial Co., Ltd.) used in Example 10 was replaced by an acrylamide-diallylamine copolymer (product name: SUMIREZ resin 1001, manufactured by Sumitomo Chemical Co., Ltd.).

Comparative Example 1

With an on-machine film transfer coater, oxidized starch (product name: MS #3800, manufactured by NIHON SHOKUHIN KAKO CO., LTD.) alone was attached onto the paper substrate in an amount of 2.5 $g/m^2$ in terms of the amount of solids attached onto both surfaces of the paper substrate. The resultant paper was on-line machine calendered, thereby producing printing paper of Comparative Example 1.

Comparative Example 2

With an on-machine film transfer coater, oxidized starch (product name: MS #3800, manufactured by NIHON SHOKUHIN KAKO CO., LTD.) and dimethylamine-epichlorohydrin polycondensate (product name: JET FIX 5052, manufactured by Satoda Chemical Industrial Co., Ltd.) as a cationic resin were attached onto the paper substrate in amounts of 2.5 $g/m^2$ and 2.0 $g/m^2$, respectively, in terms of the amounts of solids attached onto both surfaces of the paper substrate. The resultant paper was on-line machine calendered, thereby producing printing paper of Comparative Example 2.

Comparative Example 3

Printing paper of Comparative Example 3 was produced in the same manner as in Comparative Example 2, except that the dimethylamine-epichlorohydrin polycondensate (product name: JET FIX 5052, manufactured by Satoda Chemical Industrial Co., Ltd.) used in Comparative Example 2 was attached in an amount of 4.0 $g/m^2$ in terms of the amount of solids attached onto both surfaces of the paper substrate.

Comparative Example 4

Printing paper of Comparative Example 4 was produced in the same manner as in Example 1, except that calcium chloride used in Example 1 was attached in an amount of 0.5 $g/m^2$ in terms of the amount of solids attached onto both surfaces of the paper substrate.

Comparative Example 5

Printing paper of Comparative Example 5 was produced in the same manner as in Example 1, except that calcium chloride used in Example 1 and dimethylamine-epichlorohydrin polycondensate (product name: JET FIX 5052, manufactured by Satoda Chemical Industrial Co., Ltd.) as a cationic resin were attached in amounts of 0.25 $g/m^2$ and 0.25 $g/m^2$, respectively, in terms of the amounts of solids attached onto both surfaces of the paper substrate.

The printing papers of Examples 1 to 23 and Comparative Examples 1 to 5 were tested by the following methods to evaluate properties. The results are shown in Table 1.

<Offset Printability>

Images were printed over a length of 6000 m with an offset form rotary press manufactured by Miyakoshi Printing Machinery Co., Ltd. under conditions where the printing speed was 150 m/min, the inks used were T&K TOKA UV BEST CURE black and bronze red, and UV radiation value: 8 kW×2 irradiators. After printing, the occurrence of blanket piling and the quality of the print sample were visually inspected and evaluated. Practical use is possible without any problems when the print is graded 3 to 5.

5: Very good

4: Good

3: Practically usable

2: Bad

1: Very bad

<Ink Absorption Property (Dye Inks)>

Evaluation images were printed with dye inks at 150 m/min using ink jet printing machine New MJP-600 (model: MJP-20C) manufactured by Miyakoshi Printing Machinery Co., Ltd. Printing was performed in such a manner that 2 cm×2 cm square solid patterns were recorded in a single continuous row with seven colors, namely, black, cyan, magenta, yellow, and superimposed colors (red, green, blue) created by a combination of two colors out of the above three color inks except black. The printed section was visually inspected to evaluate the solid color portions and the boundaries. Practical use is possible without any problems when the print is graded 3 to 5.

5: The boundaries between colors were free from bleeding.

4: The boundaries between colors were substantially free from bleeding.

3: A boundary between colors had become blurred but was still clearly recognizable.

2: A boundary between colors was unclear, and adjacent colors had bled slightly across the boundary.

1: Each of the boundaries between colors was indistinct, and colors had bled to adjacent colors markedly.

<Water Resistance of Images (Dye Inks)>

Evaluation images were printed with dye inks at 150 m/min using ink jet printing machine New MJP-600 (model: MJP-20C) manufactured by Miyakoshi Printing Machinery Co., Ltd. 50% Halftone dot patterns and characters were printed with each of black, cyan, magenta and yellow. The printed section was allowed to stand for 24 hours and thereafter soaked in water for 30 seconds. After excess water was removed with filter paper, the printed paper was allowed to dry naturally. The print was inspected for bleeding by visual evaluation. Practical use is possible without any problems when the print is graded 3 to 5.

5: There was no bleeding.

4: Slight bleeding had been caused, but was ignorable.

3: Although there was bleeding, the halftone dots and the characters were clearly recognizable.

2: Bleeding had occurred. The halftone dots and the characters were unclear and appeared blurred.

1: Severe bleeding had occurred. The halftone dots and the characters were very unclear.

<Ink Absorption Property (Pigment Inks)>

Evaluation images were printed with pigment inks at 75 m/min using ink jet printing machine Versamark VL2000 manufactured by Eastmen Kodak Company. Printing was performed in such a manner that 2 cm×2 cm square solid patterns were recorded in a single continuous row with seven colors, namely, black, cyan, magenta, yellow, and superimposed colors (red, green, blue) created by a combination of two colors out of the above three color inks except black. The printed section was visually inspected to evaluate the solid color portions and the boundaries. Practical use is possible without any problems when the print is graded 3 to 5.

5: The boundaries between colors were free from bleeding.

4: The boundaries between colors were substantially free from bleeding.

3: A boundary between colors had become blurred but was still clearly recognizable.

2: A boundary between colors was unclear, and adjacent colors had bled slightly across the boundary.

1: Each of the boundaries between colors was indistinct, and colors had bled to adjacent colors markedly.

<Abrasion Resistance of Images (Pigment Inks)>

Evaluation images were printed with a pigment ink at 75 m/min using ink jet printing machine Versamark VL2000 manufactured by Eastman Kodak Company. An 18 cm×18 cm solid pattern of black ink was tested by being rubbed one time with a cotton gauze under a load of 500 g or 300 g after 24 hours after the pattern was printed. Practical use is possible without any problems when the print is graded 3 to 5.

5: Substantially no flaws were caused under a load of 500 g.

4: Slight flaws were caused under a load of 500 g, but the level of the flaws was acceptable.

3: Slight flaws were caused under a load of 300 g, but the level of the flaws was acceptable.

2: Some flaws were caused under a load of 300 g.

1: Severe flaws were caused under a load of 300 g.

<Uneven Printing (Pigment Inks)>

Evaluation images were printed with pigment inks at 75 m/min using ink jet printing machine Versamark VL2000 manufactured by Eastman Kodak Company. Printing was performed in such a manner that 3 cm×3 cm square solid patterns were recorded in a single continuous row with seven colors, namely, black, cyan, magenta, yellow, and superimposed colors (red, green, blue) created by a combination of two colors out of the above three color inks except black. The printed section was visually inspected to evaluate the unevenness in print density of each of the solid color portions. Practical use is possible without any problems when the print is graded 3 to 5.

5: Any unevenness in print density was not found.

4: Very slight unevenness in print density was found for one or more colors.

3: Slight unevenness in print density was found.

2: Unevenness in print density was found locally.

1: Unevenness in print density was found in the entirety of the printed section.

TABLE 1

| | | | Cationic resin/ Cation salt | | Evaluation results | | | | | |
|---|---|---|---|---|---|---|---|---|---|---|
| Example Or Comparative example | Amount of cationic resin attached g/m$^2$ | Amount of multivalent cation salt attached g/m$^2$ | Total amount attached g/m$^2$ | Ratio | Offset printability 3 or more | Ink absorption property (dyes) 3 or more | Water resistance of images (dyes) 3 or more | Ink absorption properly (pigments) 3 or more | Abrasion resistance of images (pigments) 3 or more | Uneven printing (pigments) 3 or more |
| Example 1 | 0 | 2.0 | 2.0 | 0:100 | 4 | 3 | 3 | 5 | 5 | 5 |
| Example 2 | 0.2 | 1.8 | 2.0 | 10:90 | 4 | 4 | 4 | 5 | 5 | 5 |
| Example 3 | 0.5 | 1.5 | 2.0 | 25:75 | 4 | 4 | 4 | 5 | 5 | 5 |
| Example 4 | 1.0 | 1.0 | 2.0 | 50:50 | 4 | 4 | 4 | 5 | 4 | 4 |
| Example 5 | 1.5 | 0.5 | 2.0 | 75:25 | 4 | 4 | 4 | 5 | 4 | 4 |
| Example 6 | 1.8 | 0.2 | 2.0 | 90:10 | 4 | 4 | 5 | 4 | 3 | 3 |
| Example 7 | 0 | 4.0 | 4.0 | 0:100 | 4 | 3 | 3 | 5 | 5 | 5 |
| Example 8 | 0.4 | 3.6 | 4.0 | 10:90 | 4 | 5 | 5 | 5 | 5 | 5 |
| Example 9 | 1.0 | 3.0 | 4.0 | 25:75 | 4 | 5 | 5 | 5 | 5 | 5 |
| Example 10 | 2.0 | 2.0 | 4.0 | 50:50 | 4 | 5 | 5 | 5 | 5 | 5 |
| Example 11 | 3.0 | 1.0 | 4.0 | 75:25 | 4 | 5 | 5 | 5 | 5 | 5 |
| Example 12 | 3.6 | 0.4 | 4.0 | 90:10 | 3 | 5 | 5 | 4 | 4 | 4 |
| Example 13 | 0.5 | 0.5 | 1.0 | 50:50 | 4 | 3 | 3 | 4 | 3 | 3 |
| Example 14 | 1.5 | 1.5 | 3.0 | 50:50 | 4 | 5 | 5 | 5 | 5 | 5 |
| Example 15 | 2.5 | 2.5 | 5.0 | 50:50 | 3 | 5 | 5 | 5 | 5 | 5 |
| Example 16 | 1.0 | 1.0 | 2.0 | 50:50 | 4 | 3 | 4 | 3 | 4 | 4 |
| Example 17 | 2.0 | 2.0 | 4.0 | 50:50 | 4 | 4 | 5 | 4 | 5 | 5 |
| Example 18 | 1.0 | 1.0 | 2.0 | 50:50 | 4 | 3 | 4 | 3 | 4 | 4 |
| Example 19 | 2.0 | 2.0 | 4.0 | 50:50 | 4 | 4 | 5 | 4 | 5 | 5 |
| Example 20 | 1.0 | 1.0 | 2.0 | 50:50 | 4 | 3 | 3 | 3 | 3 | 3 |
| Example 21 | 2.0 | 2.0 | 4.0 | 50:50 | 3 | 3 | 3 | 3 | 3 | 3 |
| Example 22 | 1.0 | 1.0 | 2.0 | 50:50 | 3 | 3 | 3 | 4 | 4 | 4 |
| Example 23 | 2.0 | 2.0 | 4.0 | 50:50 | 3 | 3 | 3 | 5 | 5 | 5 |

TABLE 1-continued

| Example Or Comparative example | Amount of cationic resin attached g/m² | Amount of multivalent cation salt attached g/m² | Cationic resin/Cation salt: Total amount attached g/m² | Cationic resin/Cation salt: Ratio | Evaluation results: Offset printability 3 or more | Ink absorption property (dyes) 3 or more | Water resistance of images (dyes) 3 or more | Ink absorption properly (pigments) 3 or more | Abrasion resistance of images (pigments) 3 or more | Uneven printing (pigments) 3 or more |
|---|---|---|---|---|---|---|---|---|---|---|
| Comparative example 1 | 0 | 0 | 0 | 0:0 | 4 | 1 | 1 | 1 | 1 | 1 |
| Comparative example 2 | 2.0 | 0 | 2 | 100:0 | 3 | 3 | 3 | 1 | 1 | 1 |
| Comparative example 3 | 4.0 | 0 | 4 | 100:0 | 2 | 4 | 4 | 2 | 2 | 2 |
| Comparative example 4 | 0 | 0.5 | 0.5 | 0:100 | 4 | 2 | 2 | 3 | 3 | 3 |
| Comparative example 5 | 0.25 | 0.25 | 0.5 | 50:50 | 4 | 2 | 2 | 2 | 2 | 2 |

From Table 1, it has been illustrated that the printing paper exhibits an excellent balance between offset printability and the evaluation items of ink jet printability when the printing paper includes, as main components, a paper substrate containing cellulose pulp and calcium carbonate as a filler, and an optional cationic resin, and a multivalent cation salt attached onto the paper substrate, wherein the total amount of the cationic resin and the multivalent cation salt attached on both surfaces is 1.0 g/m$^2$ to 5.0 g/m$^2$, both inclusive, and the mass ratio of the cationic resin to the multivalent cation salt is 0:100 to 90:10 both inclusive. Further, it has been shown that the printing paper exhibits a further improved balance between offset printability and the evaluation items of ink jet printability when the ratio of the cationic resin to the multivalent cation salt is 10:90 to 80:20, both inclusive.

From the comparison of Examples 4 and 10 with Examples 22 and 23, it has been shown that a particularly excellent balance in the evaluation items of ink jet printability is obtained when the printing paper contains dimethylamine-epichlorohydrin polycondensate as the cationic resin. Further, the comparison of Examples 4, 10, 16, 17, 18 and 19 with Examples 20 and 21 illustrates that the printing paper achieves a particularly excellent balance in the evaluation items of ink jet printability when a calcium salt is used as the multivalent cation salt. It has been further shown from Examples 4 and 10 compared to Examples 16 to 19 that the ink jet printability is best balanced when calcium chloride is used as the calcium salt.

On the other hand, Comparative Examples 1 to 5 which did not satisfy the conditions according to the invention failed to achieve the advantageous effects of the invention.

The invention claimed is:

1. Plain printing paper for images formed by an industrial ink jet printing machine comprising a paper substrate containing, as main components, cellulose pulp and calcium carbonate as a filler, and a cationic resin, and a multivalent cation salt attached onto the paper substrate, wherein the total amount of the cationic resin and the multivalent cation salt attached on both surfaces of the paper substrate is 1.0 g/m$^2$ to 5.0 g/m$^2$, both inclusive, and the mass ratio of the cationic resin to the multivalent cation salt is 10:90 to 80:20, both inclusive, the cationic resin is dimethylamine-epichlorhydrin polycondensate, the multivalent cation salt is a calcium salt which can be dissolved in 20° C. water atl mass % or more.

2. The plain printing paper according to claim 1, wherein the calcium salt is calcium chloride.

3. A method for forming printed images, comprising ink jet printing using a pigment ink and the plain printing paper as set forth in claim 1 at a printing speed of 60 m/min or more.

4. A method for forming printed images, comprising ink jet printing using a pigment ink and the plain printing paper as set forth in claim 2 at a printing speed of 60 m/min or more.

* * * * *